United States Patent [19]

Warner

[11] 4,023,301
[45] May 17, 1977

[54] FLY FISHING WIRE AND LURE

[76] Inventor: Terry P. Warner, 48 W. Genesee St., Baldwinsville, N.Y. 13027

[22] Filed: June 18, 1976

[21] Appl. No.: 697,385

[52] U.S. Cl. .............................. 43/42.25; 43/42.37; 43/43.16
[51] Int. Cl.² .................. A01K 83/00; A01K 85/08
[58] Field of Search ............ 43/42.25, 42.37, 43.16

[56] References Cited

UNITED STATES PATENTS

| 3,023,536 | 3/1962 | Williams | 43/43.2 |
| 3,605,317 | 9/1971 | Pobst | 43/42.25 |
| 3,690,029 | 9/1972 | Pobst | 43/42.25 |

FOREIGN PATENTS OR APPLICATIONS 202,923  8/1923  United Kingdom .............. 43/42.25

Primary Examiner—Russell R. Kinsey
Assistant Examiner—Daniel J. Leach
Attorney, Agent, or Firm—Charles S. McGuire

[57] ABSTRACT

A wire hook to which fly material may be secured to form a lure, characterized by a crimped extremity at a point farthest from the eye. The straight spear and shank portions extend from opposite sides of the crimped extremity and the curved bow is placed in a portion of the shank between the crimped extremity and the eye. The wire configuration enhances both the appearance and performance of a lure formed therefrom by attaching fly material at various points, at least a portion of such material being attached at the crimped extremity.

10 Claims, 8 Drawing Figures

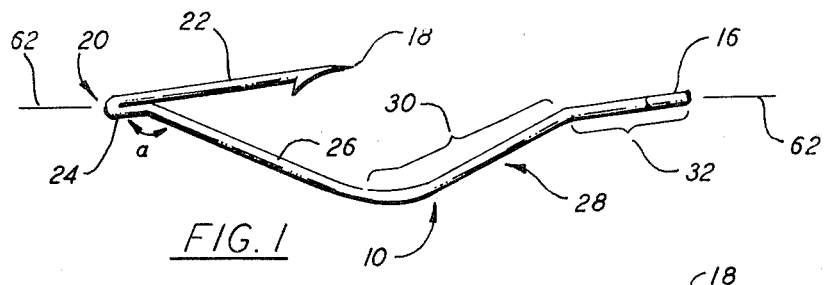

FLY FISHING WIRE AND LURE

BACKGROUND OF THE INVENTION

The present invention relates to fishing hooks and lures, and more specifically to fly fishing lures designed to simulate insects, bait, fish and other natural objects attractive to fish.

That form of artificial bait known as "flies" consists of a wire having a sharp point on one end, and one or more types of fly material secured thereto. The object is to create a lure which is attractive to a fish in its normal habitat, and which will effectively hook a fish which strikes at it. A number of considerations must be dealt with, some of which are accorded greater or lesser importance by different fishermen and lure fabricators. For example, the degree of visual identity between the artificial bait and the natural object (insect, etc.) which it simulates, and the "action" of the lure as it rests or moves in or upon the water are two such considerations.

The configuration of the wire and the type and placement thereon of the fly material are the two basic determining factors in both appearance and performance of a fly-type lure. Although a number of wire configurations are in common use, all include means such as an eye for securing a line or leader at one end, a straight shank portion, a curved portion usually termed a "bend", and a spear terminating in a sharp point, laterally spaced from the shank by virtue of the bend. Fly material is normally affixed only along the shank portion, while some point on the bend represents the lower or rearmost terminus at the greatest distance from the point of attachment of the line. Thus, fly material is not affixed to the point most remote from the end at which the wire is attached to the line. This means that only a straight part of the wire is used as the base upon which materials are mounted to simulate, for example, the body of an insect.

It is a principal object of the present invention to provide a wire for fishing flies having a configuration conducive to both realistic appearance and action of a lure fabricated therefrom.

A further object is to provide a fly-type lure having fly material affixed substantially at the point on the wire farthest from the eye to which the line is attached.

Another object is to provide a basic wire hook configuration adaptable to three variants, each having features advantageous to one of the three general classes of fishing flies.

In a more general sense, the object of the invention is to provide a novel fish hook wire, and lure formed therefrom, having superior qualities of attracting and hooking fish, while being no less economical than conventional wires and lures.

Other objects will in part be obvious and will in part appear hereinafter.

SUMMARY OF THE INVENTION

In accordance with the foregoing objects, the invention comprises a wire hook characterized by being bent upon itself to form a crimp which lies at the point most remote from the eye to which the line is attached. The straight spear portion extends from one side of the crimp to terminate in the sharp pointed end. The straight shank portion extends from the other side of the crimp, at a predetermined angle to the spear portion. The curved bow portion is incorporated in the hook at an appropriate position between the straight shank portion adjacent the crimp and the eye.

Specific variations of the wire configuration outlined in the preceding paragraph are advantageously suited for the three basic types of fishing flies, namely the streamer or bucktail, the nymph or wet fly, and the dry fly. In each case, the wire configuration enhances both the appearance and the performance of the lure, as will be apparent from the following detailed description.

BRIEF DESCRIPTION OF THE DRAWINGS

FIG. 1 is an enlarged side view of a wire hook configuration incorporating the invention and particularly suited for incorporation in a fishing fly of the streamer or bucktail type;

FIGS. 2 and 3 are side views of further species of the wire configuration, intended primarily for use in forming wet fly, and nymph or dry fly lures, respectively;

FIG. 4 is a fragmentary view of one end of the hook configuration partially prepared for fly tying;

FIG. 5 is an enlarged sectional view taken on the line 5—5 of FIG. 4; and

FIGS. 6–8 show exemplary forms of fully tied or completed lures of the streamer, wet fly and dry fly types, respectively.

DETAILED DESCRIPTION

Referring now to the drawings, the wire hook configuration of the invention is shown in three species in FIGS. 1–3 denoted as streamer wire 10, wet fly wire 12 and dry fly wire 14. Although each species is formed from a single, continuous piece of suitable gauge wire, bent and tempered according to conventional practice, for descriptive purposes the wire configurations will be denoted as comprising several sections or portions. Each species is formed with an eye at one end of the wire and a sharp point at the other end, the eyes and points being denoted in each species by common reference numerals 16 and 18, respectively. The species of FIG. 3 is shown with a conventional "rolled-in" point, which is generally regarded as providing better holding power and may, of course, be incorporated in any species of the invention. From the point 18, each of the three wires extends along a first straight axis and then is bent back upon itself, thereby forming crimped extremity 20 having first and second portions 22 and 24, respectively, in closely spaced relation on opposite sides thereof. The term "extremity" is used since this is the point on the wire farthest from the opposite extremity at eye 16. A third portion 26 of each wire extends along a second straight axis from second portion 24 at an obtuse angle a, substantially greater than 90° and less than 180° with respect thereto. Fourth portions 28 of each wire extend from the end of straight portion 26 to eye 16 and may be considered as divided into two sections; first section 30 curves from the straight axis of third portion 26 in the direction of the first straight axis of first portion 22, and second section 32 extends from the first section in a direction away from the first axis.

All of the three disclosed species may be generally described as having the common features set forth above. Specific differences in the configuration of the three wires are incorporated to enhance the effectiveness thereof when formed into a particular type of lure. For example, streamer wire 10 has a straight third portion 26 which is somewhat shorter with respect to the other portions than the third portions of wires 12 and 14. Accordingly, the curve in the wire at the initiation of the fourth portion lies substantially opposite point 18 in streamer wire 10, whereas this curve is closer to eye 16 than to point 18 in both the wet and dry fly wires 12 and 14. Another difference is the juncture of the first and second sections of the fourth portions; in the streamer and dry fly wires this juncture occurs at an angular bend, while in the wet fly wire the juncture is curved about a radius. This provides better movement of the wet fly wire through the water. Also, the angle between the axis through portion 22 and the so-called "line of pull", (i.e., a line passing through the extreme ends of the wire at the point and eye) commonly termed the "angle of attack", varies among the three species, preferably being smallest for the streamer wire and largest for the wet fly. In the illustrated embodiments, the angles of attack are 12° in streamer wire 10, 22° in wet fly wire 12 and 18° in dry fly wire 14, as the lures appear in their final form. Although some deviation is possible, of course, without noticeably affecting performance, it is preferred that deviations be not more than a few degrees.

Referring now to FIG. 4, as a first step in preparing lures from each of the three wires, the portion adjacent crimped extremity 20 is bound with line 34. The line extends around parts of the first, second and third portions in the areas thereof closest to the crimped extremity. Line 34 is preferably wound at least partly in a figure 8 pattern about the opposed portions of the wire and tied off in the usual manner. This binding has the dual purpose and effect of reinforcing the wire at the crimped extremity and of providing extended, flat, lateral surfaces in the areas denoted by reference numeral 36 in FIG. 5. Surfaces 36 provide a convenient place to which fly materials may be anchored. The sides of the wire are also somewhat flattened, as seen in the sectional view, as is the case in many fly tying wires. The binding is also advantageous in that it aids in retention on the hook. That is, if the spear passes through a fish's mouth near the edge, the sharp juncture of the first and second portions is blunted by the binding of line 34 and therefore is less likely to cut through a thin layer of flesh. The aforementioned angle of attack will be decreased somewhat, to its final configuration, when the wires are bound at the crimped extremity in the manner indicated.

FIGS. 6, 7 and 8 illustrate completed lures of the streamer, wet fly and dry fly types, respectively. It will be noted that in each of the three species of lures, the body shape of the natural object is very closely simulated. This is one of the principal advantages of the invention, and is partly achieved by the presence of lateral surfaces 36, facilitating the tying of materials at the rearmost extremity of the wire, i.e., at the point most remote from the eye. The streamer lure of FIG. 6 simulates a minnow form and includes tail materials 38, tied to lateral surfaces 36, fly materials 40, simulating the head, and upper body or hackle material 42, both of the latter being secured to the fourth portion of the wire adjacent eye 16. The third portion and first section of the fourth portion of the wire are wrapped with fly material 44 which simulates in color and outline the lower body or belly of the minnow form.

FIG. 7 illustrates an example of a nymph or wet fly lure tied on wire 12. Tail, head, body, and hackle materials 54, 56, 58, and 60, respectively, are secured to portions of the wire at essentially the same relative locations as in the other lures to simulate an immature insect in its aquatic state.

The lure shown in FIG. 8 is of the dry fly type, simulating an insect at or upon the surface of the water. Again, tail materials 46 are affixed to lateral surfaces 36 to extend approximately parallel to the axis of third portion 26, head and wing materials 48 and 50 being affixed to the forward part of the wire, adjacent eye 16, together with hackle 51. Body materials 52 are wrapped or otherwise affixed to portions of the wire intermediate of the crimped extremity and the eye.

Also of interest in connection with the wire configuration, and lures formed therefrom, of the present invention is the fact that a line extending through the forward and rearmost extremities, at eye 16 and crimp 20, constitutes the axis of balance of axis of rotation of the lure. That is, the streamer and wet fly lures may oscillate somewhat from side to side as they are drawn through the water; such oscillation will be about this axis. Thus, tail materials may be attached in any desired quantity without materially affecting this axis since they are attached substantially along the axis, as are the head materials and hackle, attached at the forward end. In fact, such materials contribute to stability of the axis of balance. Because of this, the wire may be shaped in the third and fourth portions to approximate the body shapes of natural bait forms more closely than previously known fy wires.

Basically, the dry fly uses the same principles of balance when passing through the air as the streamer and wet fly use in the water. The tail fibers, extending from crimped extremity 20 approximately parallel to third portion 26, contributes to the desired balance and attitude of the lure in the air, much like an actual May fly. Any hackle extending downwardly from the wire, which may be clipped or squared, is complemented by upward hackle and with or without a pair of divided wings, to simulate the insect in its dun or spinner stages, respectively. The orientation of the fly materials together with the axis of balance of the wire also serve to maintain the dry fly lure in the proper position on the surface of the water. The tail materials, extending parallel to the shank portion of the wire, act as outriggers providing an unbroken line of contact with the water surface. The downwardly extending hackle at the forward end of the wire assists in upholding the eye extremity above the water surface. Thus, the natural axis of balance of the wire and the convenient attachment thereto of fly materials provides a dry fly lure which moves and maintains proper orientation both as it moves through the air and as it rests upon the water.

The wire is formed so that a majority of its length is below the aforementioned axis of balance. As seen in FIG. 1, where the axis of balance is shown and indicated by reference numberal 62, substantially all of the wire except first portion 22 is below this axis. Thus, when the lure rides in the water, the straight spear, terminating in sharp point 18 will always ride upright, in the manner of keel-type hooks. The wire configuration and attachment of fly materials according to the present invention also provides an essentially "weedless" or snag-free hook, although, as previously mentioned, the basic objective is better simulation of natural bait forms.

Although completed lures have been described only of the streamer, wet fly and dry fly types, the wire configuration of the invention may be used in many other applications. For example, a spinner blade may be added on a forward extension of the streamer wire to form a spinner lure. Likewise, other materials may obviously be added to form jigs, popping plugs and spoons. Two or more of the described lures may be connected to form tandem trolling flies. Also, the wires may be used internally of minnows, smelt, shad, etc., as a bait hook.

What is claimed is:

1. A fishing fly wire comprising:
   a. an eye at one end to which a line may be attached;
   b. a sharp point at the other end;
   c. a first portion extending from said sharp point along a first straight axis;
   d. a second portion joined to said first portion at a bend of approximately 180° in the wire and extending in closely spaced relation to said first portion for a distance substantially less than the length of said first portion between said point and said bend;
   e. a third portion extending from said second portion at an obtuse angle substantially greater than 90° and less than 180° along a second straight axis; and
   f. a fourth portion connecting said third portion with said one end, and including a first section curved from said second axis in a direction toward said first axis, and a second section extending from said first section in a direction away from said first axis.

2. The invention according to claim 1 wherein at least that part of said second section of said fourth portion extending from said eye lies along a third straight axis.

3. The invention according to claim 2 wherein said first and third axes are substantially parallel.

4. The invention according to claim 1 and further including a flexible line wound around the opposing portions of said wire closely adjacent said 180° bend to form essentially flat lateral surfaces by successive turns of said line.

5. The invention according to claim 1 wherein the juncture of said third and fourth portions is closer to said one end than is said sharp point.

6. A fly fishing lure comprising:
   a. a continuous wire hook having an eye at one end and a sharp point at the other end, said wire being bent back upon itself to form a crimped extremity at a point on said wire farthest from said eye, and a bowed portion between said crimped extremity and said eye; and
   b. fly material secured to portions of said wire.

7. The invention according to claim 6 wherein at least a portion of said fly material is secured closely adjacent to said crimped extremity.

8. The invention according to claim 7 wherein said wire is bent back upon itself at an angle of at least approximately 180°.

9. The invention according to claim 6 wherein a majority of said wire lies on one side of a straight line extending through said eye and said crimped extremity and a minority of said wire which includes said sharp point lies on the other side.

10. The invention according to claim 6 and further including a flexible line wound around the opposing portions of said wire adjacent to said crimped extremity, thereby forming essentially flat lateral surfaces from successive, continuously arranged turns of said line, portions of said fly material being secured to said lateral surfaces.

* * * * *